DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED AUGUST 31, 1971

889 O.G. 1368

T889,026

SKIVING AROMATIC POLYIMIDE SHAPES

Frank Clyde Starr, Jr., Wilmington, Del., assignor to E. I. du Pont de Nemours and Company, Wilmington, Del.

Continuation of application Ser. No. 711,487, Mar. 8, 1968. This application Oct. 28, 1970, Ser. No. 84,872

Int. Cl. B29d *7/18, 7/24*

U.S. Cl. 264—158

No Drawing. 9 Pages Specification

A process for skiving a shaped article such as a cylindrical blank of aromatic polyimide polymeric material is provided wherein the cylindrical blank of polyimide such as poly-N,N′-(4,4′-oxydiphenylene) pyromellitimide is mounted on a lath and rotated at a constant speed, e.g. 20 r.p.m. and heated to, for example, 250° C. A heated skiving knife is brought into contacting relationship with the surface of the polyimide cylinder so that the knife contacts the cylinder at an angle of between about 5° and about 20°. A strip is skived from the polyimide cylinder while maintaining the temperature of the skiving knife and the temperature of the surface of the polyimide cylinder at between about 250° C. and about 500° C.